May 30, 1933.  P. RANDALL  1,911,391
SIDE DELIVERY RAKE
Filed Aug. 21, 1931   3 Sheets-Sheet 1

Inventor
Parke Randall
By N.P. Dawiate
Atty.

May 30, 1933.  P. RANDALL  1,911,391
SIDE DELIVERY RAKE
Filed Aug. 21, 1931   3 Sheets-Sheet 2

Inventor
Parke Randall
By
Atty.

May 30, 1933.   P. RANDALL   1,911,391
SIDE DELIVERY RAKE
Filed Aug. 21, 1931   3 Sheets-Sheet 3

Inventor
Parke Randall
By [signature]
Atty.

Patented May 30, 1933

1,911,391

UNITED STATES PATENT OFFICE

PARKE RANDALL, OF CROIX WASQUEHAL, FRANCE, ASSIGNOR TO INTERNATIONAL HARVESTER COMPANY, A CORPORATION OF NEW JERSEY

SIDE DELIVERY RAKE

Application filed August 21, 1931, Serial No. 558,506, and in France April 22, 1931.

The present invention relates to side delivery rakes and especially to the driving gears for that type of rake which may be used either for raking, tedding or swath turning.

As well known, such rakes usually comprise two principal frames, a draw frame supported on the road wheels, and a so-called rake frame which is connected to the draw frame and at an angle thereto in the same horizontal plane. Gears are provided between these frames to transmit the rotation of the road wheels to the rake shaft which effects the rotation of the raking cylinder, supported on the rake frame. The gear arrangements provided include means for changing the direction and speed of rotation of the rake shaft, at the will of the operator, according to the use of the machine for raking or tedding; furthermore the gear arrangements include means for rendering the rake shaft stationary when it is desired to transport the machine without rotating the raking element. In addition, the machine usually includes means to vary the angular relation between the draw and the rake frames and also means to vary the height of the raking cylinder or like element above the ground and to adjust the working angle of the tines carried thereon.

As the machine works in the field in an exceptionally dusty atmosphere due to the tossing of the hay or other causes, it is very desirable that the gears and associated parts should be protected against the entry of dust and dirt and that the lubricating arrangements should permit of the constant lubrication of the main gears and clutch parts. Moreover, in order to facilitate the assembly of the rake during manufacture or overhaul, it is advantageous to enclose the main transmission gears and the associated clutch on a housing independent of the frame itself so that the frame may be assembled and the main gear box added as an independent unit.

It is the main object of the present invention, therefore, to provide on a rake of the type mentioned, a gear housing containing the main transmission gears of the rake and clutch parts, which housing may be added to or removed from the draw frame without interfering with any parts of said frame other than the joining up or disconnection of the shaft connections between the gears in the housing and the shaft carried on the frame.

A further object relates to the housing of the gears immediately associated with the driving of the rake element in a separate gear housing disposed on the rake frame at the point where this frame adjoins the draw frame.

A yet further object relates to an automatic clutch control arrangement to enable the operator to control the gears in a simple manner.

Yet further objects, not particularly specified, will be apparent to those skilled in the art as the description of the invention proceeds.

The above objects are achieved in the present invention by arranging the main transmission gears of the rake, together with the clutch parts associated therewith, in a common gear box or housing having a suitable cover to render the box entirely oil tight and dust proof. The housing is provided with fixing means to enable it to be secured on the frame by simple means such as bolts or screws. The main spur gear of the gear assembly is mounted in the housing on a stub axle shaft which extends through opposite sides of the housing, one end of said shaft being adapted to carry one of the road wheels of the machine, while the opposite end is adapted for connection to the main axle in a simple manner. By this means, the spur gear is included in the main axle of the machine to form a part thereof, and it thus partakes of the rotation of the main axle which is, in turn, derived from the rotation of the road wheels.

The gears for transmitting the rotation of this stub axle shaft to the secondary shaft carrying the gears for driving the raking cylinder are also contained in the unitary housing. These gears comprise a pinion in mesh with the main spur gear, which pinion is provided with two integral bevel pinions of different diameters. Each bevel pinion is in mesh with one of a pair of further secondary bevel pinions carried loosely on the secondary shaft. Either secondary pinion may be connected to the secondary shaft, to transmit the rotation of the pinion to the shaft, by means of a cluch member slidably mounted on a key provided in the shaft. The arrangements are such that when one of said secondary pinions is coupled to the secondary shaft by means of the clutch, the shaft will rotate at a certain speed in one direction, while, when the other gear is coupled to the shaft, said shaft rotates in the opposite direction at a different speed.

A spring control device is associated with the lever for operating the clutch so that when the lever is moved by the operator to the desired position, the clutch parts will automatically fully engage when they arrive at the correct position to do so, without the operator having to give any attention to the matter, other than setting the lever handle in the proper notch.

The gears immediately associated with the raking cylinder are contained in a separate housing mounted on the rake frame and may be added to the frame after it is assembled as in the case of the main gear housing. The gears comprise a bevel gear and a bevel pinion in mesh therewith, the former being connected by universal joints to the secondary shaft in the main gear housing, the bevel pinion being mounted on the shaft which drives the raking element.

The invention will now be described with reference to the accompanying drawings which show an illustrative example, in which:

Figure 3 is a plan view of the gear housings showing the gears therein;

Figure 1:
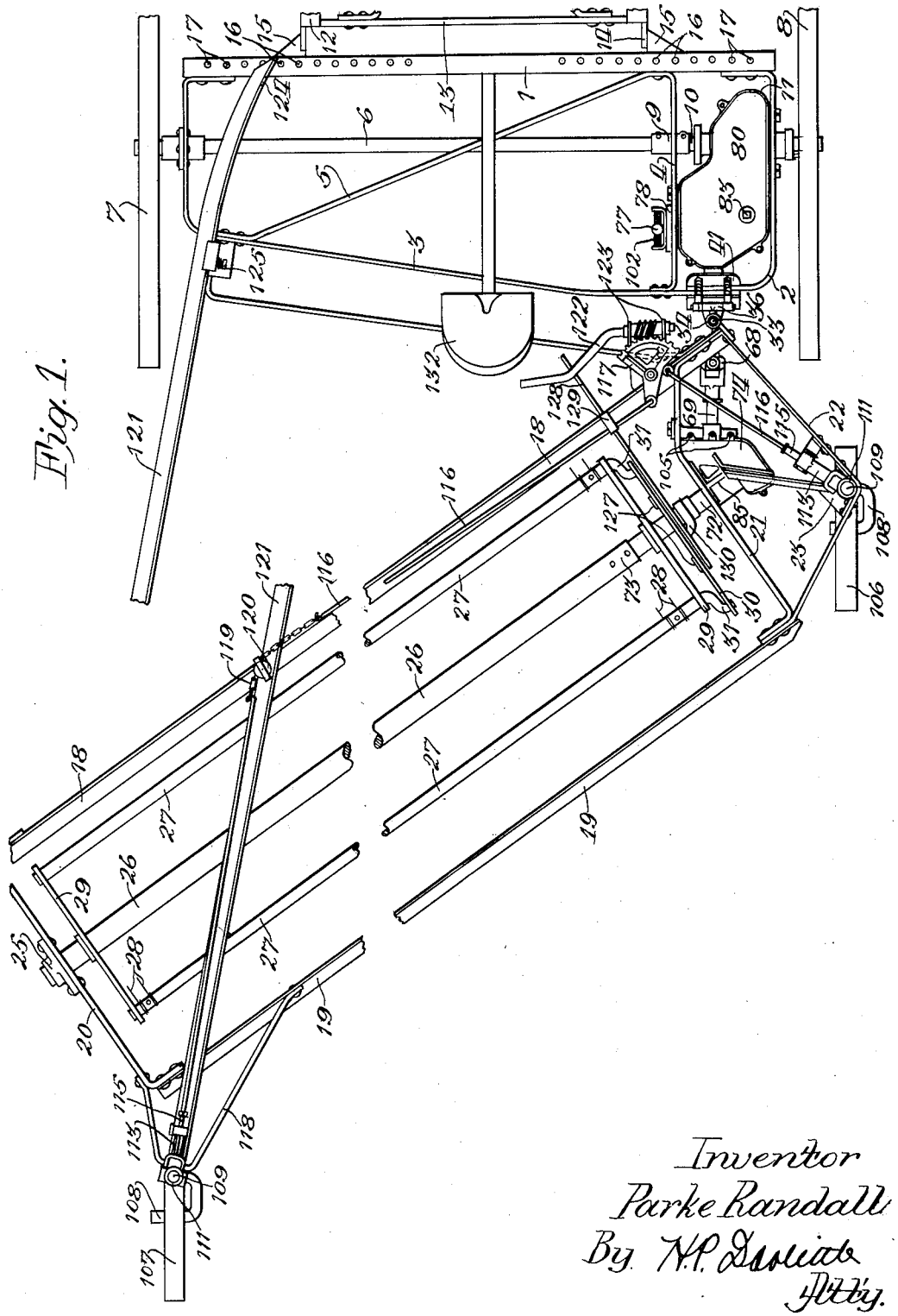
Figure 1 is a plan view of a rake embodying the invention.
Figure 2:
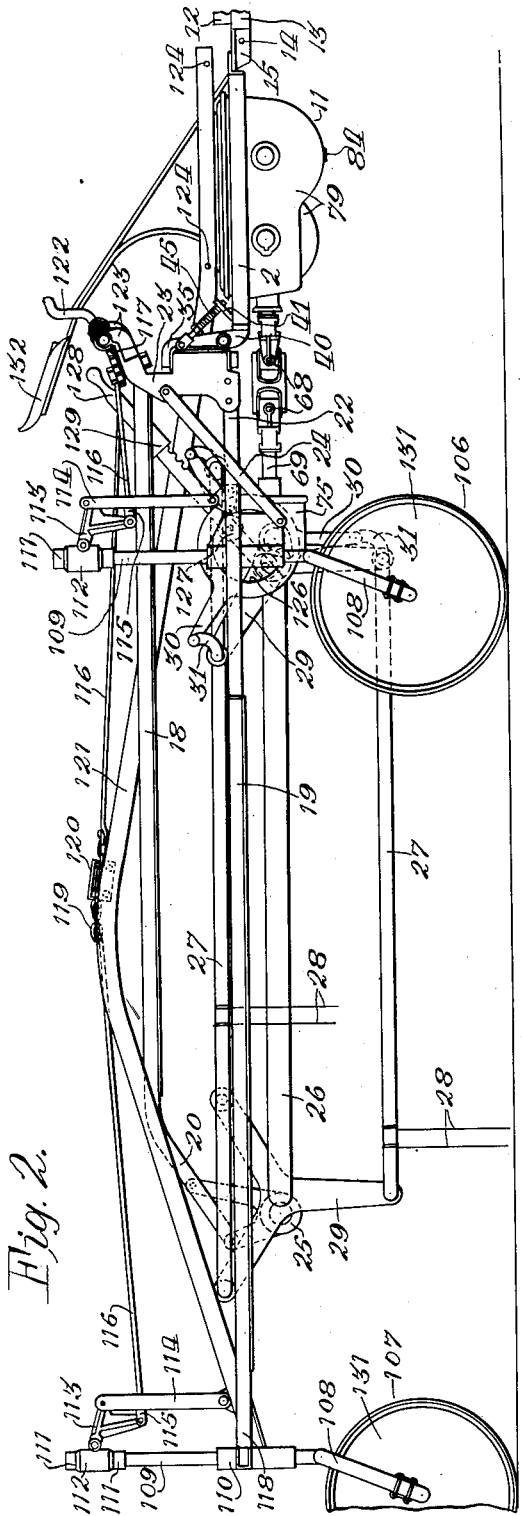
Figure 2 is a corresponding elevational view, looking on the side of the rake where the draw and rake frames adjoin.

The rake comprises two frames, the draw frame and the rake frame, of which the draw frame will be the first described, the parts of which are shown in Figures 1 and 2. This frame consists primarily of the members 1, 2, and 3, secured together by any suitable means and strengthened by braces 4 and 5. This frame is supported on a main axle 6, which carries the road wheels 7 and 8. The axle 6 is not in one piece, but extends from the wheel 7 to a clamp 9 where it is joined by this clamp to a stub shaft 10 passing through the main gear housing 11 and which carries the wheel 8 at its outer end. The purpose of this divided axle will be referred to later in this description. The pulling shafts 12 are secured to an auxiliary frame 13 pivoted at the points 14 to brackets 15 which are apertured as indicated at 16. The holes 16 register with pairs of holes 17 in the front draw frame member 1 and the brackets 15 may be secured to this member by bolts or similar means. Since member 1 is provided with a series of holes 17 as shown, the auxiliary frame 13 may be attached at various lateral positions to suit different draft conditions as may be found necessary.

The rake frame consists of the two long angle iron members 18 and 19, disposed parallel to each other, of which the rear member 19 is at a lower level relative to the ground than the front member 18. These two members are secured together at one end by a cross brace 20 and at the opposite ends by a sub-frame consisting of straps 21 and 22, the front ends of which are secured to a vertically disposed bracket 23. The upper end of bracket 23 forms a support for the member 18, as best seen in Figure 2. The strap 22 and bracket 23 are strengthened by a brace 24.

The outer cross brace 20 is provided with a bearing 25 for the shaft 26 of the raking element which comprises rake bars 27 carrying tines 28. The rake bars 27, of which there may be three or more, are rotatably carried on the arms of rake heads 29. Adjacent the inner rake head 29 is an auxiliary head 30 on which the cranked ends 31 of the rake bars 27 terminate.

Figure 7:
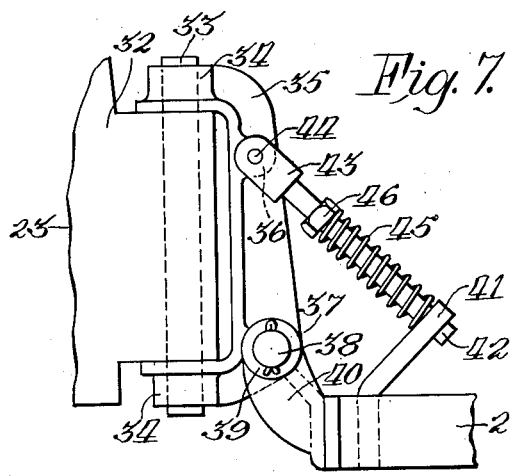
Figure 7 is a rear view of the connection between the frames.
Figure 8:
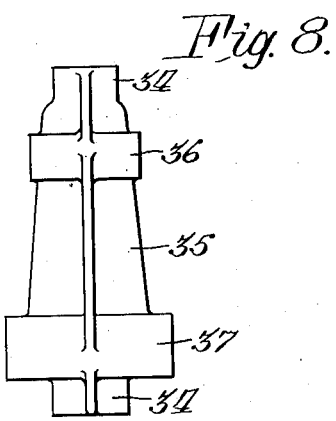
Figure 8 is a detail of a component of the connection shown in Figure 6.

The vertical bracket 23 forms the connecting point for the draw and rake frames, as will now be described. The bracket is provided with an extension 32, directed away from the rake frame, which forms a bearing for a pin 33, the upper and lower ends of which engage in bearings 34 on a further bracket member 35 of which a rear view is seen in Figure 7. This bracket 35 has an upper horizontal bearing 36 and a similar lower bearing 37 of which the latter carries a pin 38. The ends of this pin engage bearings 39 provided in bracket 40 secured to the rear draw frame member 3. At the front of this bracket 40 and secured on the frame is a plate 41 bent towards the draw frame, as may be seen in Figures 2 and 7. This plate 41 forms a support for a pair of short rods 42 which terminate in eyes 43 carried on a pin 44 in bearing 36 already mentioned. Over the rods 42 are provided springs 45, the lower ends of which are supported on the plate 41 and the upper ends bear against nuts 46 threaded on the upper part of the rods 42.

The gear arrangements which drive the raking element and which form the chief feature of this invention will now be described.

The main transmission gears between the main axle 6 of the machine and the shaft which drives the gears immediately associated with the raking element are carried in a unitary housing or box 11. As may be seen from Figure 3, the main spur gear 47 is pinned to the stub-shaft 10 as indicated at 48, and the shaft extends beyond the walls of the housing 11 at each side. One end of the shaft carries the road wheel 8 and the opposite end extends sufficiently far beyond the housing to enable it to be connected to the main axle 6 of the machine, the stub shaft and axle being secured by a clamp 9. The adjoining ends of the stub shaft and axle are provided with a key-way for the reception of a key 49 to lock the ends securely together. In order to form suitable bearings for the stub shaft 10, the sides of the housing 11 are formed with outwardly projecting extensions 50, and the bearings are provided with oil retaining washers to prevent the leakage of oil at these parts. The bearings are preferably of the roller or ball bearing type.

The main spur gear 47 is in mesh with a pinion 52 on which are formed two bevel gear portions 53 and 54, of different diameters. The pinion 52 and the bevel gears 53 and 54 integral with it, are rotatably carried on the pin bearing 55. A suitable boss 56 is provided to hold the pin in the side of the housing by means of a key 57. The bevel gears 53 and 54 are each in mesh with separate bevel pinions 58 and 59 which are loosely carried on a shaft 60 extending through the end of the housing, the housing having a suitable bearing 61 formed integral with the housing to receive the shaft. An oil retaining washer is provided for the bearing. The ends of the bevel pinions 58 and 59, facing one another, are provided respectively with clutch faces 62 and 63 which cooperate with the faces 64 and 65 on the slidable clutch member 66 which can slide on a key 67 set in the shaft 60, but which rotates with the shaft. By axial movement of the slidable clutch 66, the rotation of either bevel pinion 58, 59 may be transmitted to the shaft 60 to impart to it either a relatively slow speed of rotation when the pinion 58 is coupled to the clutch or a faster speed when the gear 59 is so coupled. Moreover, the direction of rotation of the shaft 60 will be in one direction when the former pinion is coupled and in the reverse direction when the latter pinion is coupled. When the clutch 66 is in the middle position as shown in Figure 3, the shaft 60 will be stationary, as will be understood. As well known, the raking element rotates in an anti-clockwise direction for raking and swath-turning and at a relatively low speed, while for tedding purposes it rotates in a clockwise direction at a faster speed.

The shaft 60 is connected by universal joints 68 on an intermediate shaft to a shaft 69 carrying a bevel gear 70 which is in mesh with a bevel pinion 71 keyed on a shaft 72. The shaft 72 is secured by suitable connecting means 73 to the tubular shaft 26 carrying the rake heads. The gears 70 and 71 are enclosed in a relatively small hood-like housing 74 having an under cover 75 and it is provided with suitable bearings 76 for the shafts 69 and 72.

The clutch 66 is moved into engagement with the pinions by means of a control handle 77 associated with a notched quadrant 78 secured to the side of the housing. The clutch control arrangements are of a special kind which will be referred to later.

Figure 4:
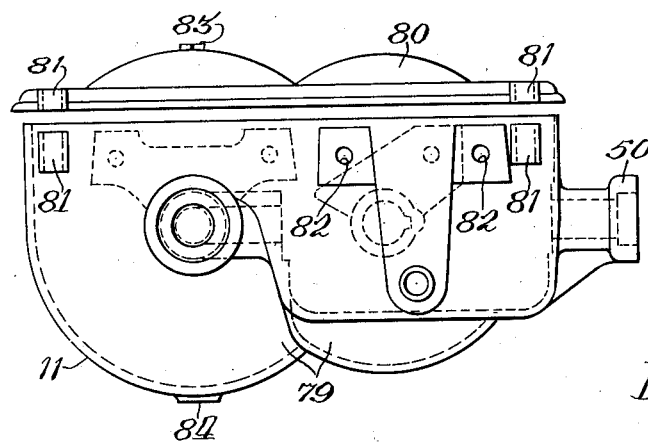
Figure 4 is a side view of the main gear housing and the cover therefor.

As may be seen from Figures 3 and 4, the gear housing 11 is of trough or disk like form, having an irregular contour of suitable shape to receive the gears and clutch parts. It has two wells 79 for the reception of the larger gears and to retain a supply of lubricant. A cover 80 is provided having a contour corresponding to the top of the housing and which is secured thereto by screws or bolts passed through holes in bosses 81 situated at convenient points in the upper edge of the housing walls and the cover. A gasket may be provided between the housing rim and the cover. Holes 82 are provided in the sides of the housing to allow it to be fixed to the draw frame by simple means such as screws or bolts.

The housing is adapted to contain a supply of lubricant to keep all the parts therein sufficiently lubricated and the gasket between the walls and the cover and the oil retaining washer render the housing perfectly oil tight. Plugs 83 and 84 are provided in the cover and base, respectively, to serve for the introduction of oil and the drawing off of waste.

It should be particularly noticed that the housing 11 just described is a unit independent of the frame in which it is carried. It contains the main transmission gears of the rake together with the associated clutch and consequently all these parts may be assembled in the housing and properly adjusted before the housing is brought to the frame to be mounted thereon.

When, therefore, the rake is assembled in the factory, the gears and clutch may be assembled in the housing and properly adjusted and the housing may then be mounted on the frame of the machine by screws or the like securing the frame to the sides of the housing. The clamp 9 may then be brought into position to secure the end of stub shaft 10 to the main axle 6 and the road wheel is keyed to the opposite end of the stub shaft, the shaft 60 being joined to one of the universal joints 68.

In a similar manner, the smaller gear housing 74 is bolted to the rake frame by suitable eye supports 105 provided therein. The housing is preferably further supported by a rib 85 provided on the top of the housing and which is suitably secured to a forwardly extending portion of the strap 21 forming part of the frame. When the housing is secured in place, the shafts 69 and 72 may be joined to the universal joint 68 and to the tubular rake shafts 26, respectively, as will be understood. The housing 74 is provided with suitable oil receiving nipples for the lubricating of the gears and bearings contained therein.

The arrangement of gear housings or boxes which may be added to or removed from the machine without interference with the parts thereof as just described, is a great advance over present methods in which the gears and clutch parts are mounted on different parts of the frame and require considerable skill and attention to ensure the correct assembly and alignment of the parts.

Figure 5:
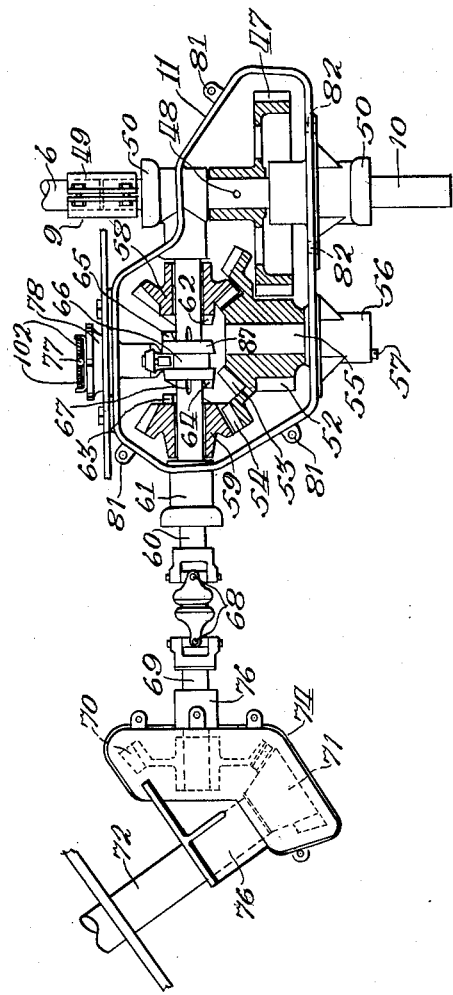
Figure 5 is a side view of the clutch control arrangements.
Figure 5:
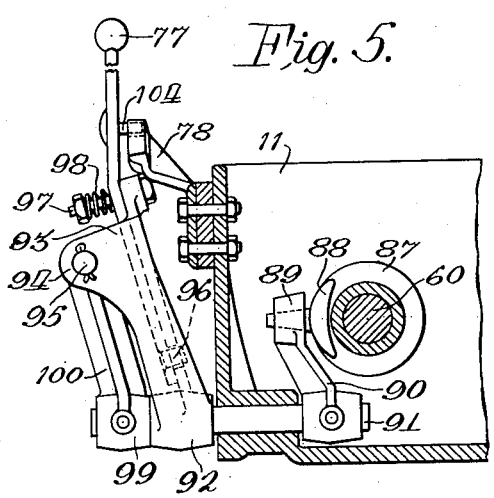
Figure 6:
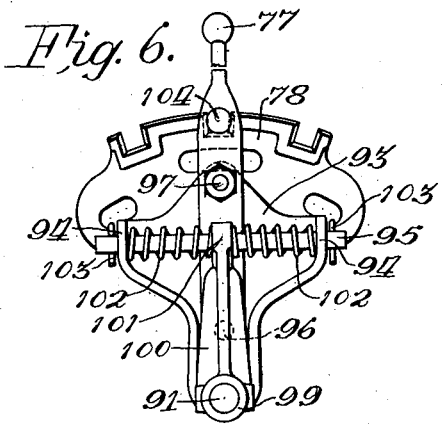
Figure 6 is an elevation showing the spring control arrangements.

The arrangements for moving the clutch member 66 are shown in Figures 5 and 6 and will now be described. The clutch 66 has two annular ribs 87 which form a guide for one end of a bifurcated clutch shifter 88, the opposite end of which is carried in an eye 89 of a shifting lever 90, pinned on a shaft 91, which extends outside the adjacent wall of the housing 11. On the shaft 91 outside the box is loosely mounted a bearing 92 of a bracket 93 which extends upwardly and laterly in a web portion which at the broadest part of the web terminates in extensions 94 apertured to form bearings for a rod 95 extending from one bearing to the other, as shown in Figure 6. The bracket 93 carries the lower end of the clutch control lever 77, the lever having a pin 96 at this part which enters the hole in the bracket. The lever is further connected to the bracket by a bolt 97 which passes through the bracket and the lever and the parts are resiliently held in contact by means of a spring 98 carried on the bolt. The shaft 91 further carries at its outer end the lower bearing portion 99 of a member 100 which is pinned to the shaft. The upper part of this member 100 carries an eye 101 through which the rod 95 passes. Springs 102 are provided on the rod, arranged one at each side of the eye 101, between the eye and the bearing 94 of the bracket 93. Pins 103 are inserted in the ends of the rod 95 to prevent its lateral movement. The lever 77 bears against the quadrant 78 provided on the walls of the housing 11 and has a pin 104 adapted to engage notches in the quadrant to retain the lever at specified positions.

When it is desired to move the clutch 66 from one position to another, the lever handle 77 is moved relative to the quadrant 78 to the required position determined by a notch in said quadrant. The movement of the lever effects the corresponding movement of the bracket 93 and also of the member 100 pinned on the shaft 91, so that the shaft is rotated to move the lever 90 and clutch shifter 88, so sliding the clutch 66 on the shaft 60 to the required position. The member 100 is constrained to follow the movement of the bracket 93, because the eye 101 of said member is carried between the springs 102 on the rod 95 and when the lever 77 is moved as described, and the clutch parts on the clutch 66 fully engage with the clutch parts 62 or 63 on the bevel pinion 58 or 59, the member 100 will move in exact alignment with the lever 77.

It will be understood, however, that at the moment the hand lever 77 is moved, the cooperating clutch parts on the clutch 66 and on the pinion 58 or 59 may not be in a position to fully engage, because the full engagement of clutch and pinion can occur only when the notch on one part is exactly opposite the recess on the cooperating part, and this coincidence can occur only at certain positions of the revolving shaft 60 on which the clutch 66 is mounted.

In such a case, although the movement of the bracket 93 will move through a distance corresponding to the movement of the hand lever 77, the shaft 91 will not be able to rotate to the same extent, but will partake of only a portion of this movement, and the member 100 pinned on this shaft will also have a similar partial movement, and consequently will not move in alignment with the hand lever. Accordingly one of the springs 102, that towards which the member 100 is inclined, will be compressed and will tend to force said member 100 into alignment with the lever. Therefore, this spring 102 acting through member 100 will tend to rotate the shaft 91 so as force the clutch faces into full engagement. When, therefore, due to the continued forward movement of the machine, the cooperating clutch faces arrive at a position when the notch on one is opposite the recess on the other, the parts will automatically fully engage, the member 100 thereupon coming into alignment with the hand lever and the spring pressures on each side of said member being again equalized.

From this explanation it will be understood that the operator, when desiring to couple up either pinion 58 or 59, merely has to move the hand lever controlling the clutch to the desired position, without having to retain the handle until the clutch parts engage, because the proper engagement of these parts will follow automatically as the machine moves forward.

The ends of the rake frame are supported by castor wheels 106 and 107, which are adjustably attached to the frame in the following manner: Each wheel is carried on the cranked end 108 of a rod 109 bent as shown in Figure 2 and having a vertical portion of which the lower end is slidably supported in a sleeve 110 secured to the rake frame, and the upper end carries two short sleeves 111 secured against axial movement, between which is rotatably carried a further sleeve 112. The sleeve 112 carries an eye which forms the pivot point for the attachment of the center of a bell crank lever 113 of which one arm is pivotally attached to the end of a vertically disposed strap 114, of which the opposite and lower end is secured at a convenient point on the frame.

The other arm of the bell crank lever 113 is pivotally attached to a threaded thimble 115 which forms the connecting point of a rod 116 which connects the bell crank lever to a toothed adjusting segment 117. The sleeve 110 which is associated with castor wheel 106 is secured to the member 22 of the sub frame already described, while the sleeve 110 associated with the wheel 107 is secured on an auxiliary triangular frame 118 attached to the outer rear corner of the sub-frame. It will be noticed from Figure 1 that a chain 119 is interposed in the connecting rod 116 connected to the support 109 of the wheel 107 and the chain runs on a pulley 120 attached to an angle iron member 121 secured at its rear end to the triangular sub frame 118 and extending forwardly over the rake frame to the draw frame.

The teeth of the segment 117 engage with a worm provided on the end of a crank 122 carried in bearings 123 carried on a bracket secured at a convenient point on the rake frame.

The height of the raking element above the ground may be adjusted by raising or lowering the sleeves 110 associated with the castor wheels 106 and 107. This is effected by means of the crank and worm 122, which, when turned, effects the turning of the quadrant 117, so pulling or pushing on rods 109 and therefore on the arms of the bell crank levers 113 connected to the clevises 115. The force acting on these lever arms takes effect to slide the lower sleeves 110 on the rods, so raising or lowering the ends of the rake frame connected to the sleeves. It will be understood that when the rake is adjusted in this manner, the two ends of the frame move uniformly. Each end of the frame may be adjusted independently of the other end by adjusting the nut connected at the ends of the threaded clevises 115 which varies the length of the corresponding connecting rod 116. The castor wheels 106 and 107 are preferably of a type having discs 131 covering the spokes, at least on one side, to prevent the hay winding in the wheels.

In Figure 2 it will be seen that the angle iron bar 121 is bent to clear the rake frame and that its front end rests on the draw frame. The purpose of this bar is to secure the outer ends of the frames from relative movement and to this end the vertically disposed part of the front end of the bar is provided with two or more holes 124 adapted to receive the end of a spring latch 125 secured on the draw frame member 3. When it is desired to adjust the angular relation between the draw and rake frames, such as when narrowing the machine for transport purposes, the latch 125 is withdrawn from the rear hole 124 in the bar 121 and the frames are thereby released and may be adjusted to the required angle and locked in this position by restoring the latch. It will be understood that during this operation, the rake frame swings around the vertical pivot 33.

The auxiliary rake head 30 is formed with an inner annulus 126 which forms the track for a pair of rollers 127 disposed diametrically opposite each other in the annulus and which are carried on a lever 128. The under side of this lever has a series of notches adapted to engage a stop provided in a slide 129 secured to member 18 of the rake frame. At a point between the rollers 127 on the lever 128 there is provided a short crank member 130 loosely carried at its other end on the shaft 72. The device just described is provided to permit of the angular adjustment of the tines on the rake bars and this is accomplished by adjusting the lever 128 in the slide 129, which turns the crank 130 so displacing the auxiliary rake head 30 relative to the head 29 and thus turns the cranked ends 31 of the rake bars and alters their angular relation to the ground.

A suitable seat 132 is provided for the operator.

Although the arrangements described are more especially appliable to a side delivery rake of the type which may be used for raking swath turning or tedding, since the gears are relatively complicated, it will be understood that unitary gear boxes which are attachable and detachable from the machine frame may be used for those types of single purpose side delivery rakes or hay tedding machines in which the rake frame retains a constant relation to the draw frame.

What is claimed is:

1. A side delivery rake and tedder comprising a wheel supported draft frame, a wheel supported rake frame pivotally secured to the draft frame at one end on vertical and transverse axes and extending diagonally rearwardly therefrom, resilient means to hold the two frames against relative rotation about the transverse axis, a rotatable raking member carried by the rake frame, means for driving said member including a forwardly projecting shaft mounted on the rake frame, a rearwardly projecting driving shaft mounted on the draft frame, and means including universal joints for connecting said shafts.

2. A side delivery rake and tedder comprising a draft frame, a gear housing removably mounted on said frame at one end thereof, shafts projecting laterally from said housing, a wheel mounted on one of said shafts, an axle shaft removably connected at one end to the other shaft, a wheel mounted on the other end of said axle shaft, said wheels supporting the draft frame, a rake frame secured to the draft frame at one end and extending diagonally rearwardly therefrom, supporting wheels at each end of the rake frame, a rotatable raking member carried by the rake frame, means for driving said member including a forwardly projecting shaft mounted on the rake frame, a rearwardly projecting shaft extending from the gear housing, and means including universal joints for connecting said shafts.

3. A side delivery rake and tedder comprising a draft frame, a gear housing removably mounted on said frame at one end thereof, transversely aligned shafts projecting laterally from said housing, a wheel mounted on one of said shafts, an axle shaft removably connected at one end to the other shaft, a wheel mounted on the other end of said axle shaft, said wheels supporting the draft frame, a wheel supported rake frame pivotally secured to the draft frame at one end on vertical and transverse axes and extending diagonally rearwardly therefrom, resilient means to hold the two frames against relative rotation about the transverse axis, a rotatable raking member carried by the rake frame, and means for driving said member including a driving shaft mounted on the draft frame and flexible driving connections between the rake frame and said shaft.

4. A side delivery rake and tedder comprising a draft frame, a gear housing removably mounted on said frame at one end thereof, transversely aligned shafts projecting laterally from said housing, a wheel mounted on one of said shafts, an axle shaft removably connected at one end to the other shaft, a wheel mounted on the other end of said axle shaft, said wheels supporting the draft frame, a rake frame pivotally secured to the draft frame at one end on vertical and transverse axes and extending diagonally rearwardly therefrom, resilient means to hold the two frames against relative rotation about the transverse axis, swiveled supporting wheels at each end of the rake frame, a rotatable raking member carried by the rake frame, means for driving said member including a forwardly projecting shaft mounted on the rake frame, a rearwardly projecting shaft extending from the gear housing, and means including universal joints for connecting said shafts.

5. A side delivery rake and tedder comprising a draft frame, a gear housing removably mounted on said frame at one end thereof, transversely aligned shafts projecting laterally from said casing, a wheel mounted on one of said shafts, an axle shaft removably connected at one end to the other shaft, a wheel mounted on the other end of said shaft, said wheels supporting the draft frame, a rake frame pivotally secured to the draft frame at one end on vertical and transverse axes and extending diagonally rearwardly therefrom, resilient means to hold the two frames against relative rotation about the transverse axis, swiveled supporting wheels at each end of the rake frame, means to simultaneously alter the vertical position of both of said wheels relative to the rake frame, a bracing member connected to the rake frame near its rear end and adjustably connected to the draft frame whereby the relative angular position of said frames may be adjusted, a rotatable raking member carried by the rake frame, means for driving said member including a forwardly projecting shaft mounted on the rake frame, a rearwardly projecting shaft extending from the gear casing, and means including universal joints for connecting said shafts.

In testimony whereof I affix my signature.

PARKE RANDALL.